(12) United States Patent
Bednar et al.

(10) Patent No.: US 10,587,989 B2
(45) Date of Patent: Mar. 10, 2020

(54) QUALITY OF SERVICE IN VEHICLE

(71) Applicant: Ford Global Technologies, LLC, Dearborn, MI (US)

(72) Inventors: Chad Bednar, Royal Oak, MI (US); Mahmoud Abdelhamid, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/723,421

(22) Filed: Oct. 3, 2017

(65) Prior Publication Data
US 2019/0104385 A1 Apr. 4, 2019

(51) Int. Cl.
| | |
|---|---|
| *B60W 50/10* | (2012.01) |
| *G07C 5/00* | (2006.01) |
| *H04L 29/08* | (2006.01) |
| *H04W 4/02* | (2018.01) |
| *H04W 48/02* | (2009.01) |
| *H04W 4/04* | (2009.01) |
| *H04W 4/90* | (2018.01) |

(52) U.S. Cl.
CPC .......... *H04W 4/046* (2013.01); *B60W 50/10* (2013.01); *G07C 5/008* (2013.01); *H04L 67/125* (2013.01); *H04W 4/027* (2013.01); *H04W 4/90* (2018.02); *H04W 48/02* (2013.01)

(58) Field of Classification Search
CPC ........ H04L 67/12; H04L 67/125; H04W 4/48; H04W 4/027; H04W 4/90; H04W 4/046; H04W 48/02; H60W 50/10; G07C 5/008
See application file for complete search history.

(56) References Cited

U.S. PATENT DOCUMENTS

| | | | |
|---|---|---|---|
| 9,420,432 B2 | 8/2016 | Matthews, III et al. | |
| 2002/0111715 A1* | 8/2002 | Richard | B60R 16/0231 701/1 |
| 2004/0122730 A1* | 6/2004 | Tucciarone | G06Q 10/107 705/14.36 |
| 2008/0312782 A1* | 12/2008 | Berdichevsky | B60L 53/305 701/22 |
| 2010/0333146 A1* | 12/2010 | Pickney | B60R 11/0235 725/75 |
| 2014/0068010 A1* | 3/2014 | Nicholson | B60K 35/00 709/219 |
| 2014/0164579 A1* | 6/2014 | Douthitt | G07C 5/008 709/219 |
| 2014/0309863 A1 | 10/2014 | Ricci | |
| 2016/0183280 A1* | 6/2016 | Chow | H04W 72/12 370/337 |
| 2017/0322687 A1* | 11/2017 | Lavian | G06F 3/0482 |
| 2017/0334500 A1* | 11/2017 | Jarek | B62J 99/00 |
| 2018/0247067 A1* | 8/2018 | Hrabak | G06F 21/6218 |

* cited by examiner

*Primary Examiner* — Mussa A Shaawat
(74) *Attorney, Agent, or Firm* — Michael Spenner; Brooks Kushman, P.C.

(57) ABSTRACT

A vehicle includes a display including selectable indicia related to a plurality of mobile devices operable to enable a user to select a one of the plurality. The vehicle includes a controller configured to limit internet protocol traffic of the one traversing through a wireless access point within the vehicle to preserve quality of service for messages sent via the wireless access point related to the impact. The limitation is responsive to impact of the vehicle.

12 Claims, 2 Drawing Sheets

QUALITY OF SERVICE IN VEHICLE

TECHNICAL FIELD

This disclosure relates to quality of service in vehicles.

BACKGROUND

Modern vehicles are equipped with communications systems that can provide wireless network connections to vehicle occupants and send important information to event responders during transients. The common use of the communications systems may cause unacceptable performance during transients.

SUMMARY

A vehicle includes a display including selectable indicia related to a plurality of mobile devices operable to enable a user to select a one of the plurality. The vehicle includes a controller configured to limit internet protocol traffic of the one traversing through a wireless access point within the vehicle to preserve quality of service for messages sent via the wireless access point related to the impact. The limitation is responsive to impact of the vehicle.

A method includes selecting one of a plurality of indicia from a display of a vehicle related to a plurality of mobile devices. The method includes limiting internet protocol traffic of the one traversing through a wireless access point of a vehicle responsive to impact of the vehicle to preserve quality of service for messages sent via the wireless access point related to the impact.

A vehicle includes a controller configured to limit internet protocol traffic traversing through a wireless access point within the vehicle of one of a plurality of mobile devices selected from a display having indicia operable to enable a user to select the one such that quality of service for messages sent via the wireless access point related to the impact is preserved. The limitation is responsive to impact of the vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may include a network connection configured to connect the vehicle with an internet service provider. The internet service provider may provide data communications over the internet for the vehicle, enabling over-the-air updates, media, or navigational information. The network connection may be shared through an access point with occupants of the vehicle. For example, the occupants may have tablets, computers, or phones that a capable of connecting to the access point.

The vehicle may experience transient situations where communication offboard the vehicle is necessary. For example, the vehicle may sense an impact. Information related to the occupants may be sent offboard to event responders. The event responders may provide emergency assistance. A shared data connection between the vehicle and the occupants may limit bandwidth available during the transient situation. For example, the occupants may be using all available bandwidth to stream videos or games. The data throughput associated with the occupants may be reduced or eliminated during the transient conditions to ensure vehicular data is transmitted.

Figure 1:
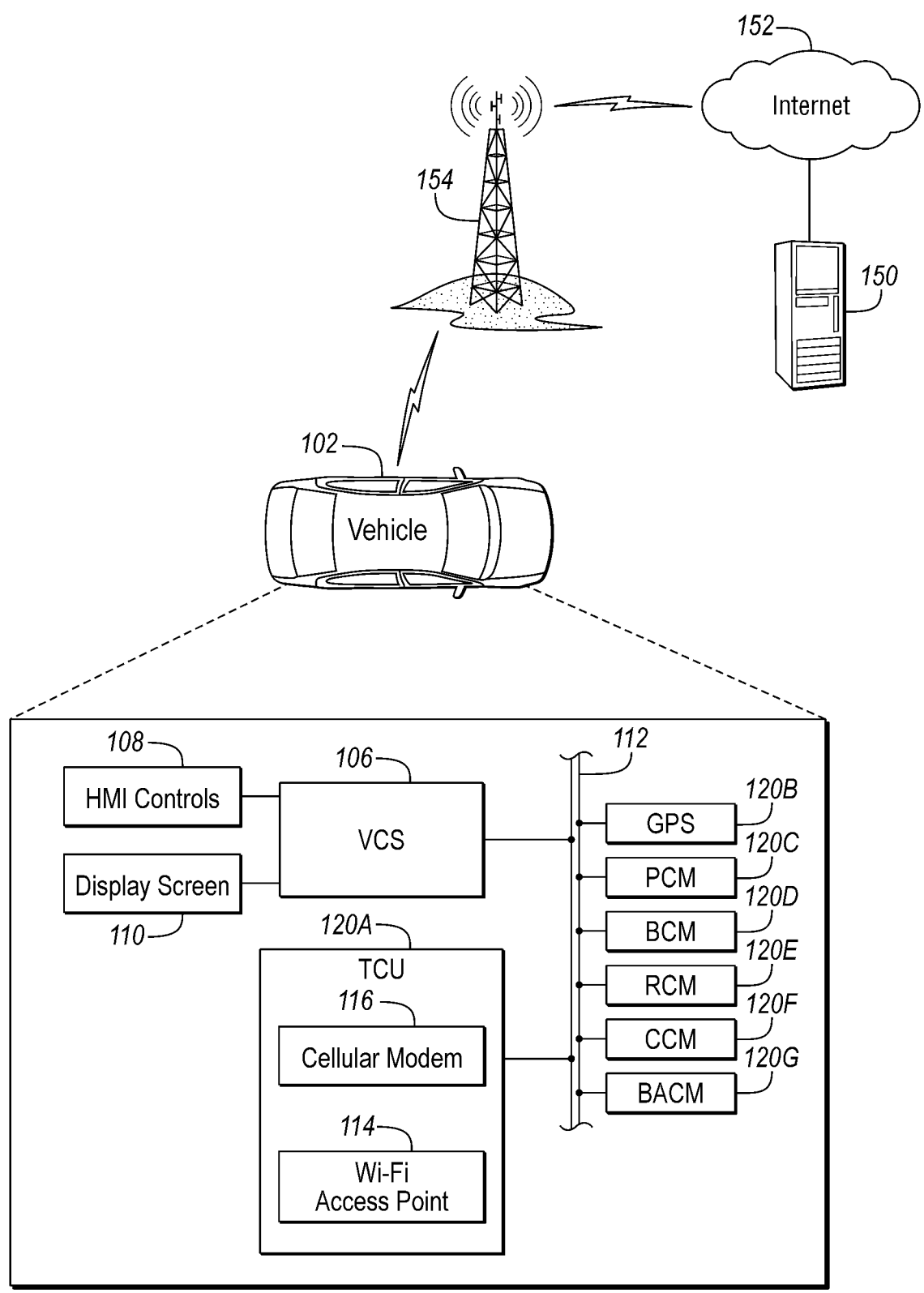
FIG. 1 is a schematic of a vehicle telematics system.

FIG. 1 illustrates an example vehicle 102 implementing controllers to communicate with a remote server 150. The vehicle 102 may include a vehicle computing system (VCS) 106 configured to communicate using a telematics control unit (TCU) 120-A over a wide-area network 152 (e.g., cellular, Wi-Fi, SRC, IEEE 802.11p, VANET) using a cellular modem 116. The system also includes a vehicle data server 150 configured to send and receive vehicle transient information. The transient information may be relayed to emergency responders or other institutions. While an example system is shown in FIG. 1, the example components as illustrated are not intended to be limiting. Indeed, the system may have more or fewer components, and additional or alternative components and/or implementations may be used. Some functions may be performed by the vehicle, the server, or a combination thereof.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 106 may be configured to support voice command and BLUETOOTH interfaces with the driver and driver carry-on devices, receive user input via various buttons or other controls, and provide vehicle status information to a driver or other vehicle 102 occupants. An example VCS 106 may be the SYNC system provided by FORD MOTOR COMPANY of Dearborn, Mich.

The VCS 106 may further include various types of computing apparatus in support of performance of the functions of the VCS 106 described herein. In an example, the VCS 106 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc.

The VCS 106 may also receive input from human-machine interface (HMI) controls 108 configured to provide for occupant interaction with the vehicle 102. For instance, the VCS 106 may interface with one or more buttons or other HMI controls 108 configured to invoke functions on the VCS 106 (e.g., steering wheel audio buttons, a push-to-talk button, instrument panel controls, etc.). The VCS 106 may also drive or otherwise communicate with one or more displays 110 configured to provide visual output to vehicle occupants, e.g., by way of a video controller. In some cases, the display 110 may be a touch screen further configured to receive user touch input via the video controller, while in other cases the display 110 may be a display only, without touch input capabilities. In an example, the display 110 may be a head unit display included in a center console area of the vehicle 102 cabin. In another example, the display 110 may be a screen of a gauge cluster of the vehicle 102.

The VCS 106 may be further configured to communicate with other components of the vehicle 102 via one or more in-vehicle networks 112 or vehicle buses 112. The in-vehicle networks 112 may include one or more of a vehicle controller area network (CAN), an Ethernet network, and a media oriented system transfer (MOST), as some examples. The in-vehicle networks 112 may allow the VCS 106 to communicate with other vehicle 102 systems, such as a vehicle modem of the TCU 120-A (which may not be present in some configurations), a global positioning system (GPS) module 120-B configured to provide current vehicle 102 location and heading information, and various other vehicle ECUs configured to cooperate with the VCS 106. As some non-limiting possibilities, the vehicle ECUs may include a powertrain control module (PCM) 120-C configured to provide control of engine operating components (e.g., idle control components, fuel delivery components, emissions control components, etc.) and monitoring of engine operating components (e.g., status of engine diagnostic codes); a body control module (BCM) 120-D configured to manage various power control functions such as exterior lighting, interior lighting, keyless entry, remote start, and point of access status verification (e.g., closure status of the hood, doors and/or trunk of the vehicle 102); a radio transceiver module (RCM) 120-E configured to communicate with key fobs or other local vehicle 102 devices; a climate control management (CCM) 120-F module configured to provide control and monitoring of heating and cooling system components (e.g., compressor clutch and blower fan control, temperature sensor information, etc.); and a battery control module (BECM) 120-G configured to monitor the state of charge or other parameters of the battery of the vehicle 102.

The wide-area network 152 may include one or more interconnected communication networks such as the Internet, a cable television distribution network, a satellite link network, a local area network, a wide area network, and a telephone network, as some non-limiting examples. The network medium may be over radio frequency. For example, a collection of radio towers 154 may be used to propagate the signal. Using an embedded modem 116 of the VCS 106, the vehicle 102 may be able to send outgoing data from the vehicle 102 to network destinations on the wide-area network 152, and receive incoming data to the vehicle 102 from network destinations on the wide-area network 152. The vehicle may also send and receive data from the V2V modem 122 or the WPAN modem 116. It should be appreciated that any of the communicated information disclosed herein may be provided by any combination of processors located internally or externally with respect to the vehicle and transmitted using any combination of networking protocols. The processing may be distributed throughout vehicles 102 in the vicinity of the event or performed on a backend server 150. The vehicle 102 may include various communication mediums and methods to distribute vehicle path information among all vehicles, autonomous and non-autonomous, affected by the event. For example, the vehicles 102 may form an ad-hoc, distributed network to distribute processing of the gesture or path information. The vehicles 102 may form a distributed network to communicate detour instructions and travel paths among one another. The vehicles 102 may cooperatively determine rejection rates or altered travel paths.

The TCU 120-A may include a cellular modem or other network transceiver configured to facilitate communication over the wide-area network 152 between the vehicle 102 and other devices of the system. In an example, the VCS 106 may be configured to access the communications features of the TCU 120-A by communicating with the TCU 120-A over a vehicle bus 112. As some examples, the Vehicle Bus® may include a controller area network (CAN) bus, an Ethernet bus, or a MOST bus. In other examples, the VCS 106 may access the wide-area network 152 using the communications services of the mobile device. In an example, the VCS 106 may communicate with the mobile device over a local area connect (e.g., BLUETOOTH), and the mobile device, in turn, communicates over the wide-area network 152 using a cellular modem of the mobile device. The TCU 120-A may include a wireless access point 114 to provide a local network to occupants of the vehicle. The local network may run on an 802.11 protocol or other implement.

Figure 2:
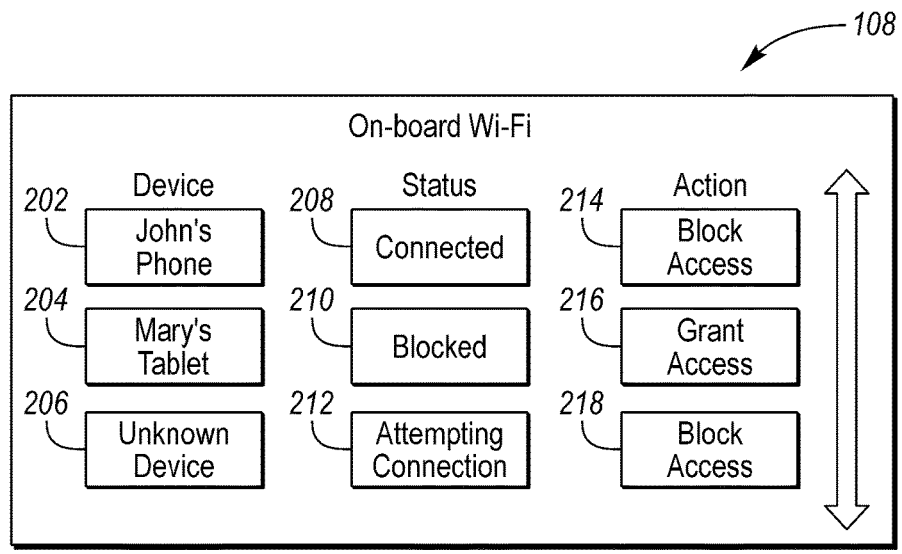
FIG. 2 is a display of a vehicle including indicia.

Referring to FIG. 2, a display 108 is shown. The display includes a plurality of selectable indicia 202, 204, 206, 208, 210, 212, 214, 216, 218. The selectable indicia may be associated with an occupant of the vehicle. For example, selectable indicia 202 denotes John's phone. Indicia 202, 204, 206 in the device column include a separate indicator for each mobile device connected to the wireless access point 114. The indicia may be selectable by touching the screen, voice activation, or other human-machine interactions.

The indicia 208, 210, 212 in the status column denote the connection status of the device. The information displayed in the status column may further relate to the amount of data throughput associated with the given device. The status column indicia 208, 210, 212 may further indicate the categorization of the connected devices 202, 204, 206. For example, a driver may have a different data throughput categorization than a passenger or child.

The action column indicia 214, 216, 218 allows the user to set the categorization or permit or deny access. The selection may be based on other factors and events. For example, a user may use the selectable indicia 214, 216, 218 to set the category, prevent access to the network during a transient, limit the network traffic through the access point or another network appliance.

Figure 3:
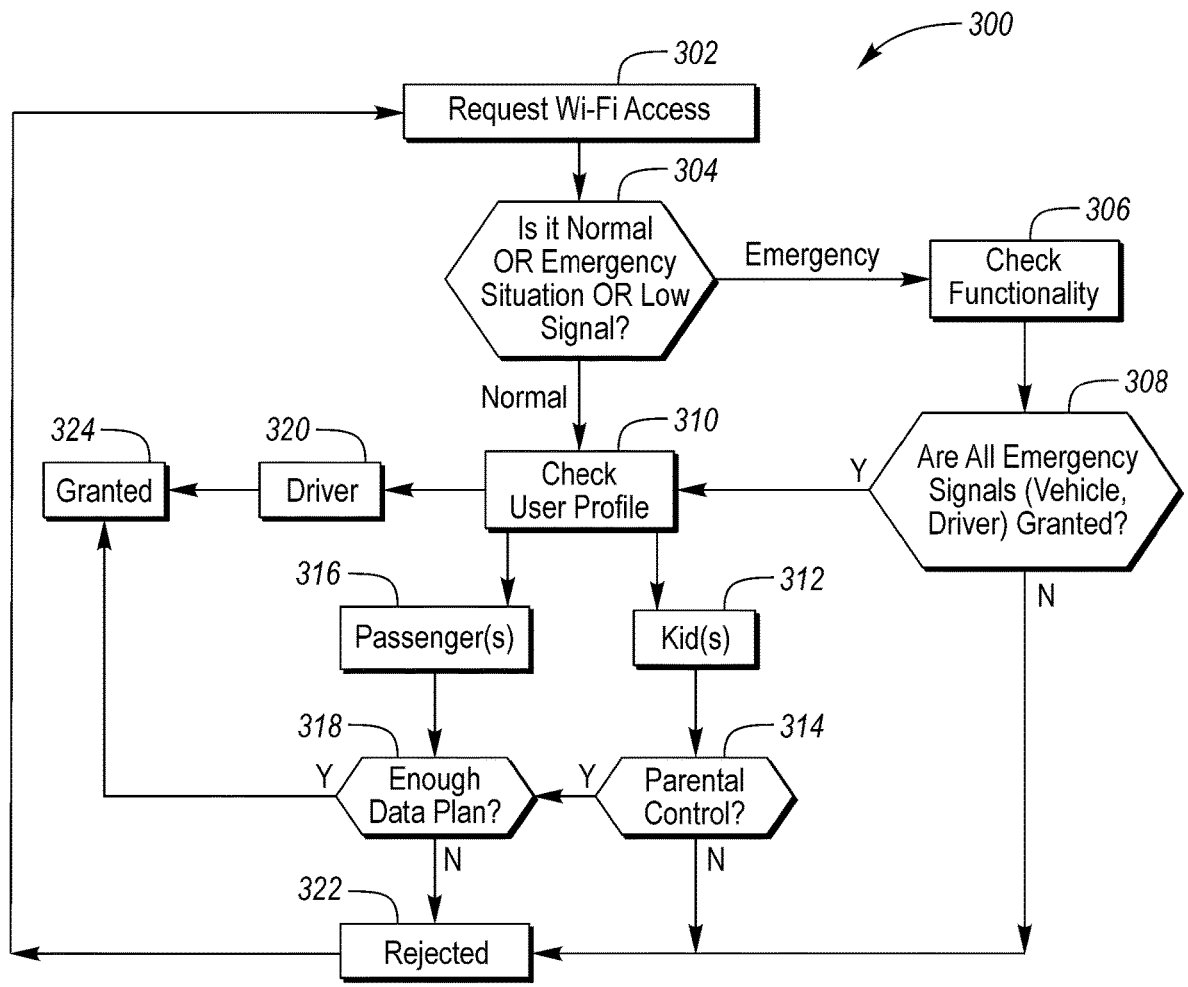
FIG. 3 an algorithm for limiting internet protocol traffic.

Referring to FIG. 3, an algorithm 300 is shown. The algorithm 300 may be continuously operating and the order of operations may be changed or augmented. Steps may be added or deleted. The algorithm includes a request for Wi-Fi or network access 302 from the wireless access point 114 or another network appliance. A user device may request to use available data paths to receive information from a website or other content. The controller may be configured to limit internet protocol traffic traversing through a wireless access point. The internet protocol traffic may be any protocol or designation. Before forwarding the request, the controller determines the current system state, in step 304. An emergency state may be an impact or other vehicular transient. Sensory input may provide the controller with notification of the impact. During an emergency or low signal, the controller may limit the bandwidth for the attached devices.

In step 306, the functionality of the internet connection is checked by the controller. This may include a padded packet, sending a ping, or sending an IMCP request. If the emergency traffic is unable to be sent or delayed by more than a predetermined threshold, the controller will reject the traffic request from the user device in step 322. For example, if the latency between the sent signal and the notification of receipt is above a predetermined threshold, the controller may limit other vehicle traffic.

If the emergency communications are still available and unencumbered, the controller may check the user profile or categorization of the traffic request in step 310. Based on the user profile assigned to the device by the user, the controller may grant the traffic request or require further review. For example, if the traffic request is from a device associated with the driver in step 320, the controller will grant the traffic request in step 324. The controller may be configured in particular embodiments to always allow driver traffic, even during an impact. The controller may be configured to only limit traffic requests associated with a child's device. If the user category is a generic passenger in step 316, the controller may determine the amount of data left on the data plan in step 318. If there is still data remaining or an amount above a predetermined threshold, the controller may grant the traffic request. Otherwise, the controller will reject the passenger traffic request. If the traffic request is from a child's device, the controller may determine whether there are parental controls related to the child's device. For example, the child may have a predetermined amount of data traffic allocated to prevent overuse. The controller may reject the traffic request based on the parental controls in step 314 or allow the traffic is there is enough data left on the plan. The system may retain traffic consumption by each of the attached devices. The devices may be associated in a database or table with each occupant. The traffic consumption may be retained to request payment from the passengers for their consumption. The request may be based on the percentage of consumption of the entire data plan for the vehicle.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
  a display, including selectable indicia related to a plurality of mobile devices, operable to enable a user to select one of the selectable indicia to request for network access; and
  a controller configured to:
    receive a notification of an impact at the vehicle,
    limit receipt of the request for network access in response to receiving the notification of the impact to limit internet protocol traffic to preserve quality of service for messages sent via the wireless access point related to the impact,
    receive transient offboard communications in response to the impact,
    in response to the transient offboard communications being unencumbered, compare a user profile associated with the selected indicia with a permissible profile, and
    grant the request for network access in response to the profile including a permissible user category.

2. The vehicle of claim 1, wherein the at least one is a mobile device associated with a passenger of the vehicle.

3. The vehicle of claim 1, wherein the display is operable to enable the user to prevent internet protocol traffic from traversing through the wireless access point associated with the one.

4. The vehicle of claim 1, wherein the internet protocol traffic is toggled based on a quantity of wireless data remaining on a wireless subscription plan.

5. A method comprising:
  selecting one of a plurality of indicia from a display of a vehicle related to a plurality of mobile devices; and
  receiving a notification of an impact at the vehicle,
  limiting, in response to receiving the notification of the impact, internet protocol traffic of the one traversing through a wireless access point of the vehicle to preserve quality of service for messages sent via the wireless access point related to the impact.

6. The method of claim 5, wherein the at least one is a mobile device associated with a passenger of the vehicle.

7. The method of claim 5, wherein the display is operable to enable the user to prevent internet protocol traffic from traversing through the wireless access point associated with the one.

8. The method of claim 5, wherein the internet protocol traffic is toggled based on a quantity of wireless data remaining on a wireless subscription plan.

9. A vehicle comprising:
  a controller configured to:
    receive a notification of an impact at the vehicle, receive transient offboard communications in response to the impact, limit receipt of a request for network access in response to receiving the notification of the impact to limit internet protocol traffic to preserve quality of service for messages sent via the wireless access point related to the impact, in response to the transient offboard communications being unencumbered, compare a user profile associated with the request for network access, and grant the request for network access in response to the profile including a permissible user category.

10. The vehicle of claim 9, wherein the at least one is a mobile device associated with a passenger of the vehicle.

11. The vehicle of claim 9, wherein the display is operable to enable the user to prevent internet protocol traffic from traversing through the wireless access point associated with the one.

12. The vehicle of claim 9, wherein the internet protocol traffic is toggled based on a quantity of wireless data remaining on a wireless subscription plan.

* * * * *